(12) United States Patent
Bandel et al.

(10) Patent No.: US 10,361,637 B2
(45) Date of Patent: Jul. 23, 2019

(54) UNIVERSAL INPUT ELECTRONIC TRANSFORMER

(71) Applicant: Hubbell Incorporated, Shelton, CT (US)

(72) Inventors: Michael William Bandel, North Aurora, IL (US); Alok Vishambhar Dayal Pandey, Maharashtra (IN); Glenn Donald Garbowicz, Algonquin, IL (US)

(73) Assignee: Hubbell Incorporated, Shelton, CT (US)

( * ) Notice: Subject to any disclaimer, the term of this patent is extended or adjusted under 35 U.S.C. 154(b) by 104 days.

(21) Appl. No.: 14/664,379

(22) Filed: Mar. 20, 2015

(65) Prior Publication Data

US 2016/0276949 A1    Sep. 22, 2016

(51) Int. Cl.
*H02M 5/45* (2006.01)
*H02M 5/458* (2006.01)
(Continued)

(52) U.S. Cl.
CPC ............. *H02M 5/458* (2013.01); *H02M 1/10* (2013.01); *H02M 3/337* (2013.01); *H02M 7/06* (2013.01); *H02M 1/4258* (2013.01); *H02M 3/156* (2013.01); *H02M 5/45* (2013.01); *H02M 2001/0006* (2013.01); *H02M 2001/007* (2013.01); *H02M 2001/0064* (2013.01); *Y02B 70/126* (2013.01)

(58) Field of Classification Search
CPC .......... H02M 5/458; H02M 5/45; H02M 1/10; H02M 1/4258; H02M 3/337; H02M 7/06; H02M 2001/0006; H02M 2001/0064; H02M 2001/007

USPC ........ 363/17, 24, 34, 37, 56.05, 70, 71, 123; 323/207, 208; 307/46, 66, 82, 105, 130; 361/62, 58
See application file for complete search history.

(56) References Cited

U.S. PATENT DOCUMENTS 3,324,377 A * 6/1967 Mills ...................... H02M 3/337
                                                            363/17
3,414,801 A * 12/1968 Bishop ................ H01L 23/3157
                                                            331/113 A
(Continued)

OTHER PUBLICATIONS

PCTUS2016/023104 International Search Report and Written Opinion dated Jun. 20, 2016.

*Primary Examiner* — Matthew V Nguyen
*Assistant Examiner* — Nusrat Quddus
(74) *Attorney, Agent, or Firm* — Michael Best & Friedrich, LLP

(57) ABSTRACT

An electronic transformer including an input receiving an input voltage. The input voltage being at least one selected from the group consisting of a first input voltage and a second input voltage. The electronic transformer further including a rectifier receiving the input voltage and outputting a rectified voltage; an inverter receiving the rectified voltage and selectively outputting an inverted voltage; a controller receiving the rectified voltage and controlling the inverter to output the inverted voltage; and an output transformer receiving the inverted voltage and outputting an output voltage. Wherein the output voltage is substantially the same regardless of the input voltage being the first input voltage or the second input voltage.

18 Claims, 14 Drawing Sheets

(51) Int. Cl.
  *H02M 1/10* (2006.01)
  *H02M 3/337* (2006.01)
  *H02M 7/06* (2006.01)
  *H02M 1/42* (2007.01)
  *H02M 3/156* (2006.01)
  *H02M 1/00* (2006.01)

(56) References Cited

U.S. PATENT DOCUMENTS

| | | | | |
|---|---|---|---|---|
| 3,448,367 A * | 6/1969 | Corey | ............... | H02M 1/38 219/661 |
| 3,470,449 A * | 9/1969 | Risberg | ............ | H02M 7/517 363/135 |
| 4,060,757 A * | 11/1977 | McMurray | ......... | H02M 7/5152 363/135 |
| 4,426,564 A * | 1/1984 | Steigerwald | ...... | H02M 7/53803 219/624 |
| 4,471,419 A * | 9/1984 | Schneider | ............ | H02M 7/527 318/807 |
| 4,709,318 A * | 11/1987 | Gephart | ................ | H02J 9/062 307/66 |
| 4,717,994 A * | 1/1988 | Diaz | ................. | H02M 3/3376 323/285 |
| 4,719,550 A * | 1/1988 | Powell | ................. | H02J 9/062 307/46 |
| 5,563,777 A | 10/1996 | Miki et al. | | |
| 5,661,645 A | 8/1997 | Hochstein | | |
| 5,925,990 A | 7/1999 | Crouse et al. | | |
| 6,396,715 B1 * | 5/2002 | Zhang | ................ | H02M 1/10 363/132 |
| 7,109,438 B2 * | 9/2006 | Ishii | .................. | H02M 1/10 219/130.1 |
| 7,920,392 B2 * | 4/2011 | Schneider | ............ | H02J 3/1814 307/105 |
| 8,030,853 B1 | 10/2011 | Wong et al. | | |
| 8,305,779 B2 * | 11/2012 | Lu | ........................ | H02J 9/062 363/37 |
| 2002/0071299 A1 * | 6/2002 | Franck | ............... | H05B 39/045 363/97 |
| 2002/0149892 A1 * | 10/2002 | Williams | ............ | H02H 9/025 361/58 |
| 2004/0090800 A1 * | 5/2004 | Moisin | ............. | H05B 41/2822 363/17 |
| 2005/0029966 A1 | 2/2005 | Bounocunto | | |
| 2007/0279019 A1 | 12/2007 | Wilson | | |
| 2008/0224633 A1 | 9/2008 | Melanson et al. | | |
| 2009/0196072 A1 * | 8/2009 | Ye | ..................... | H02M 7/493 363/17 |
| 2011/0155703 A1 | 6/2011 | Winn | | |
| 2011/0266966 A1 | 11/2011 | Veeken | | |
| 2013/0049622 A1 * | 2/2013 | Angeles | ............. | H05B 33/083 315/224 |
| 2013/0271021 A1 | 10/2013 | Elferich | | |
| 2014/0021180 A1 | 1/2014 | Vogel | | |
| 2014/0376287 A1 * | 12/2014 | Narimani | ............ | H02M 3/07 363/60 |
| 2015/0036403 A1 * | 2/2015 | Yu | ........................ | H02J 3/383 363/132 |

* cited by examiner

US 10,361,637 B2

UNIVERSAL INPUT ELECTRONIC TRANSFORMER

BACKGROUND

The present application generally relates to transformers, more specifically, electronic transformers used for providing power to light-emitting diodes (LEDs).

Transformers are commonly used in alternating-current (AC) voltage distribution systems. Traditionally, transformers are electromagnetic devices for use at low AC line frequencies. Electronic transformers are a variation of electromagnetic transformers. Both electromagnetic transformers and electronic transformers are commonly used in the lighting industry. While the electromagnetic transformer remains a ubiquitous industry standard for use in stepping up, stepping down, and/or isolating electrical distribution, electromagnetic transformers have severe limitations of size, weight, and technological characteristics.

SUMMARY

To overcome some of these limitations, a device consistent with one or more of the exemplary embodiments disclosed herein provides an electronic transformer including an input receiving an input voltage. The input voltage being at least one selected from the group consisting of a first input voltage and a second input voltage. The electronic transformer further including a rectifier receiving the input voltage and outputting a rectified voltage, an inverter receiving the rectified voltage and selectively outputting an inverted voltage, a controller receiving the rectified voltage and controlling the inverter to output the inverted voltage and an output transformer receiving the inverted voltage and outputting an output voltage. Additionally, the output voltage according to one or more exemplary embodiments is substantially the same regardless of the input voltage being the first input voltage or the second input voltage.

In another embodiment an electronic transformer is provided including an input receiving an input voltage. Wherein the input voltage is at least one selected from the group consisting of a first input voltage and a second input voltage. The electronic transformer further including a rectifier receiving the input voltage and outputting a rectified voltage, a first inverter receiving the rectified voltage and selectively outputting a first inverted voltage, a second inverter receiving the rectified voltage and selectively outputting a second inverted voltage and a controller. The controller according to this and other embodiments receives the rectified voltage. The controller in this and other exemplary embodiments is configured to selectively control the first inverter to output the first inverted voltage when the input voltage is the second input voltage, and selectively control the first and second inverters to output the first and second inverted voltages when the input voltage is the first input voltage. The electronic transformer further includes an output transformer receiving at least one selected from the group consisting of the first inverted voltage and a combination of the first and second inverted voltages, where the output transformer further outputs an output voltage.

Another exemplary embodiment of the disclosure provides a method of transforming a voltage. This exemplary method includes receiving an input voltage, the input voltage being at least one selected from the group consisting of a first input voltage and a second input voltage, rectifying the input voltage, outputting a rectified voltage, inverting the rectified voltage, selectively outputting an inverted voltage, receiving the inverted voltage and outputting an output voltage. Wherein the output voltage is substantially the same regardless of the input voltage being the first input voltage or the second input voltage.

Other aspects of exemplary embodiments of the devices and methods disclosed will become apparent by consideration of the detailed description and accompanying drawings.

DETAILED DESCRIPTION

Before any embodiments of the present application are explained in detail, it is to be understood that the devices and methods disclosed herein are not limited in their application to the details of construction and the arrangement of components set forth in the following description or illustrated in the following drawings. The exemplary devices and methods disclosed are capable of other embodiments and of being practiced or of being carried out in various ways.

Figure 1:
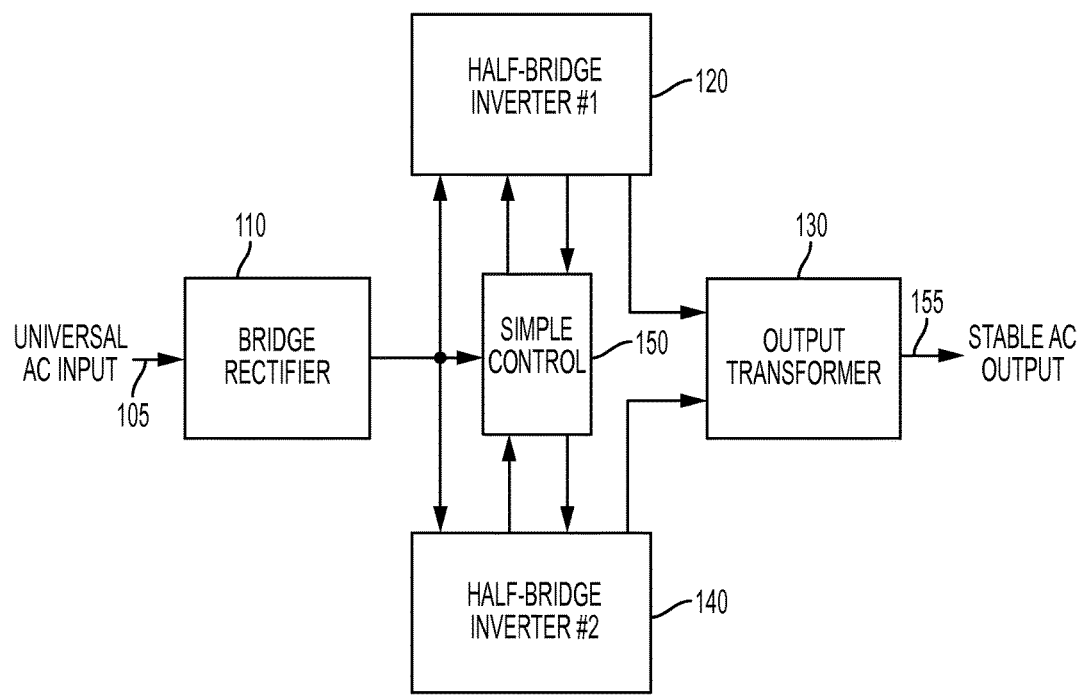
FIG. 1 is a block diagram illustrating a universal input electronic transformer according to one embodiment of the present application.

FIG. 1 is a block diagram illustrating a simple universal input electronic transformer (SUIET) 100 according to one embodiment of the present application. The SUIET 100 includes an input 105, a rectifier 110, a first inverter 120, an output transformer 130, a second inverter 140, a controller, or control, 150, and an output 155. The input 105 receives an input voltage. In some embodiments, the input voltage is approximately 120VAC having a 50 Hz or 60 Hz frequency or approximately 277VAC having a 50 Hz or 60 Hz frequency. In other embodiments, the input voltage is within a range of approximately 90VAC to approximately 305VAC.

Figure 2:
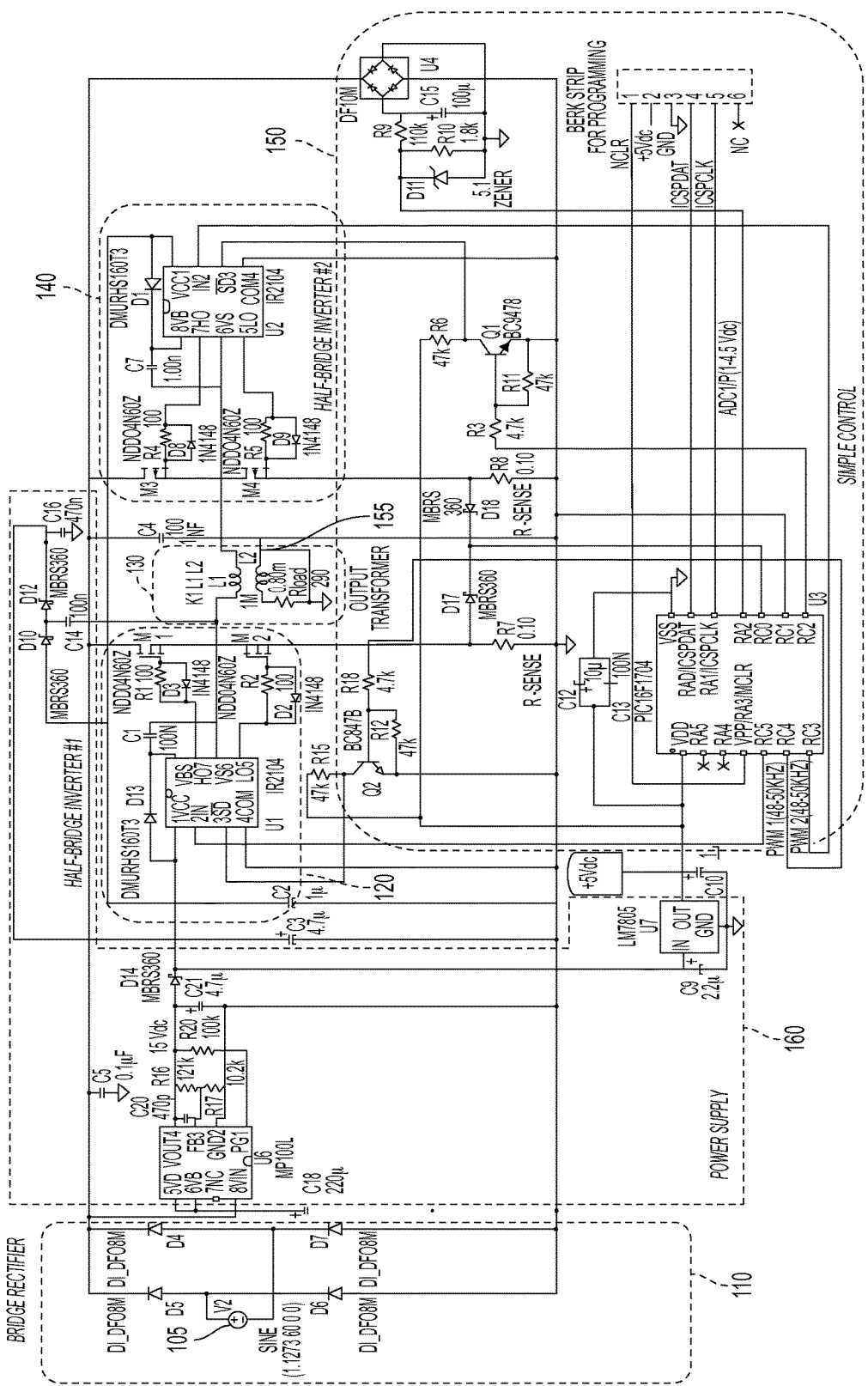
FIG. 2 is a circuit diagram illustrating the universal input electronic transformer of FIG. 1.

FIG. 2 is a circuit diagram illustrating the components of the SUIET 100. The rectifier 110 receives the input voltage at the input 105, rectifies the input voltage, and outputs a rectified voltage (e.g., a positively pulsating, direct-current (DC) half sine wave voltage). In the illustrated embodiment, the rectifier 110 is a bridge rectifier including four diodes D1-D4. In other embodiments, the rectifier 110 includes only two diodes. In some embodiments, the rectifier 110 further includes a filter capacitor configured and minimized to maintain a half sine wave, 120 Hz envelope of rectified voltage. The rectified voltage is output to the first inverter 120, the second inverter 140, and the controller 150.

In the illustrated embodiment of FIG. 2, the rectified voltage is also received by a power supply 160. In such an embodiment, the power supply 160 supplies a nominal DC voltage (e.g., 5V DC, 10V DC, 15V DC, etc.) to the controller 150 and/or other components or modules of the SUIET 100 (e.g., a first drive U1 and a second driver U2 of the first inverter 120 and the second inverter 140 respectively). The power supply 160 is also configured to supply lower voltages to operate circuits and components within the controller 150 or SUIET 100. In some embodiments, the power supply 160 and the rectifier 110 are a single module that receives the input voltage and outputs the rectified voltage and the nominal DC voltage. In other embodiments, the controller 150 receives power (e.g., in the form of the rectified voltage) directly from the rectifier 110.

The first inverter 120 and the second inverter 140, or first and second converters, switch the rectified voltage (i.e., invert the rectified DC-voltage to a switched AC-voltage). In the illustrated embodiment, the first inverter 120 and the second inverter 140 are half-bridge inverters, the first inverter 120 including switches M1, M2 and the first driver U1 and the second inverter 140 including switches M3, M4 and the second driver U2. In some embodiments, switches M1-M4 are semiconductors, such as but not limited to, transistors, field-effect transistors (FETs), bipolar junction transistors (BJT), junction field-effect transistor (JFET), metal-oxide-semiconductor field-effect transistors (MOSFETs), insulated-gate bipolar transistors (IGBTs), and insulated-gate field-effect transistors (IGFETs). The first and second drivers U1, U2 receive control signals (e.g., a high-voltage signal [5V DC] or a low-voltage signal [0V DC]) and selectively turn the switches M1-M4 on and off based on received control signals. In operation, when M1 is turned on, M2 must be turned off, and vice-versa. Similarly, when M3 is turned on, M4 must be turned off, and vice-versa. For example, but not limited to, if the first driver U1 receives a high-voltage signal, first driver U1 turns switch M1 on and switch M2 off. If the first driver U1 receives a low-voltage signal, first driver U1 turns switch M1 off and switch M2 on.

The controller 150 outputs the control signals to the first and second drivers U1, U2 for selectively controlling the switches M1-M4. The outputted control signals are based on the received rectified voltage. The controller 150 includes a plurality of electrical and electronic components that provide power, operational control, and protection to the components and modules within the controller 150. For example, the controller 150 includes, among other things, a processing unit (e.g., a microprocessor, a microcontroller, or another suitable programmable device), a memory, input units and output units. In some embodiments, the controller 150 is implemented partially or entirely on a semiconductor (e.g., a field-programmable gate array ["FPGA"] semiconductor) chip, such as a chip developed through a register transfer level ("RTL") design process.

The memory includes, for example, a program storage area and a data storage area. The program storage area and the data storage area can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, or electronic memory devices. The processing unit is connected to the memory and executes software instructions that are capable of being stored in a RAM of the memory (e.g., during execution), a ROM of the memory (e.g., on a generally permanent basis), or another non-transitory computer readable medium such as another memory or a disc. Software included in the implementation of the SUIET 100 can be stored in the memory of the controller 150. The software includes, for example, firmware, one or more applications, program data, filters, rules, one or more program modules, and other executable instructions. The controller 150 is configured to retrieve from memory and execute, among other things, instructions related to the control processes and methods described herein. In other constructions, the controller 150 includes additional, fewer, or different components.

The switched voltage, from the first inverter 120 and the second inverter 140, is received by the output transformer 130. The output transformer 130 includes a primary coil L1 and a secondary coil L2. The primary coil L1 receives the inverted voltage. Upon receiving the switched voltage, the primary coil L1 electromagnetically induces a switched high frequency (e.g., 50 KHz) output voltage to the secondary coil L2. The output voltage is then output from the output 155. The output voltage is substantially the same regardless of the fixed input voltage (e.g., 120VAC RMS or 277VAC RMS). For example, the output voltage is approximately 106VAC RMS at 120VAC RMS input and 133VAC RMS at 277VAC RMS input; or, approximately 12VAC RMS at the two input voltages of merit (e.g., 120VAC RMS or 277VAC RMS); or, approximately 24VAC RMS at the two input voltages of merit (e.g., 120VAC RMS or 277VAC RMS).

In one example of operation, an input voltage of either 120VAC RMS or 277VAC RMS is received at the input 105. The input voltage is rectified by the rectifier 110 and output to the first inverter 120, the second inverter 140, and the controller 150. If the input voltage is 120VAC RMS, the controller 150 outputs control signals to the first inverter 120 and the second inverter 140 to selectively output switched voltages to the output transformer 130. If the input voltage is 277VAC RMS, the controller 150 outputs control signals to only the first inverter 120 to selectively output a switched voltage to the output transformer 130. The output transformer 130 then outputs a transformed voltage that is approximately the same (e.g., approximately 106VAC RMS to approximately 133VAC RMS; or approximately 12VAC RMS to approximately 24VAC RMS) regardless of the input voltage being 120VAC RMS or 277VAC RMS.

Figure 3:
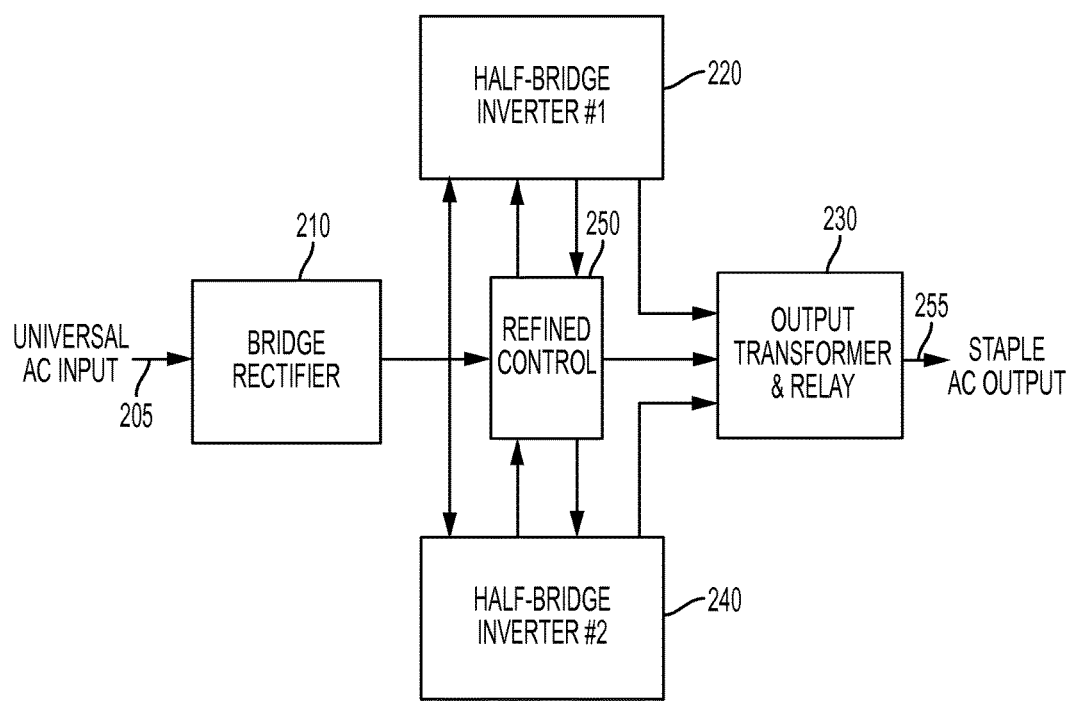
FIG. 3 is a block diagram illustrating a universal input electronic transformer according to another embodiment of the present application.

FIG. 3 is a block diagram illustrating a refined universal input electronic transformer (RUIET) 200 according to another embodiment of the present application. The RUIET 200 includes an input 205, a rectifier 210, a first inverter 220, an output transformer & relay 230, a second inverter 240, a refined control, or controller 250, and an output 255. The input 205 receives the input voltage (e.g., 120VAC RMS or 277VAC RMS).

Figure 4A:
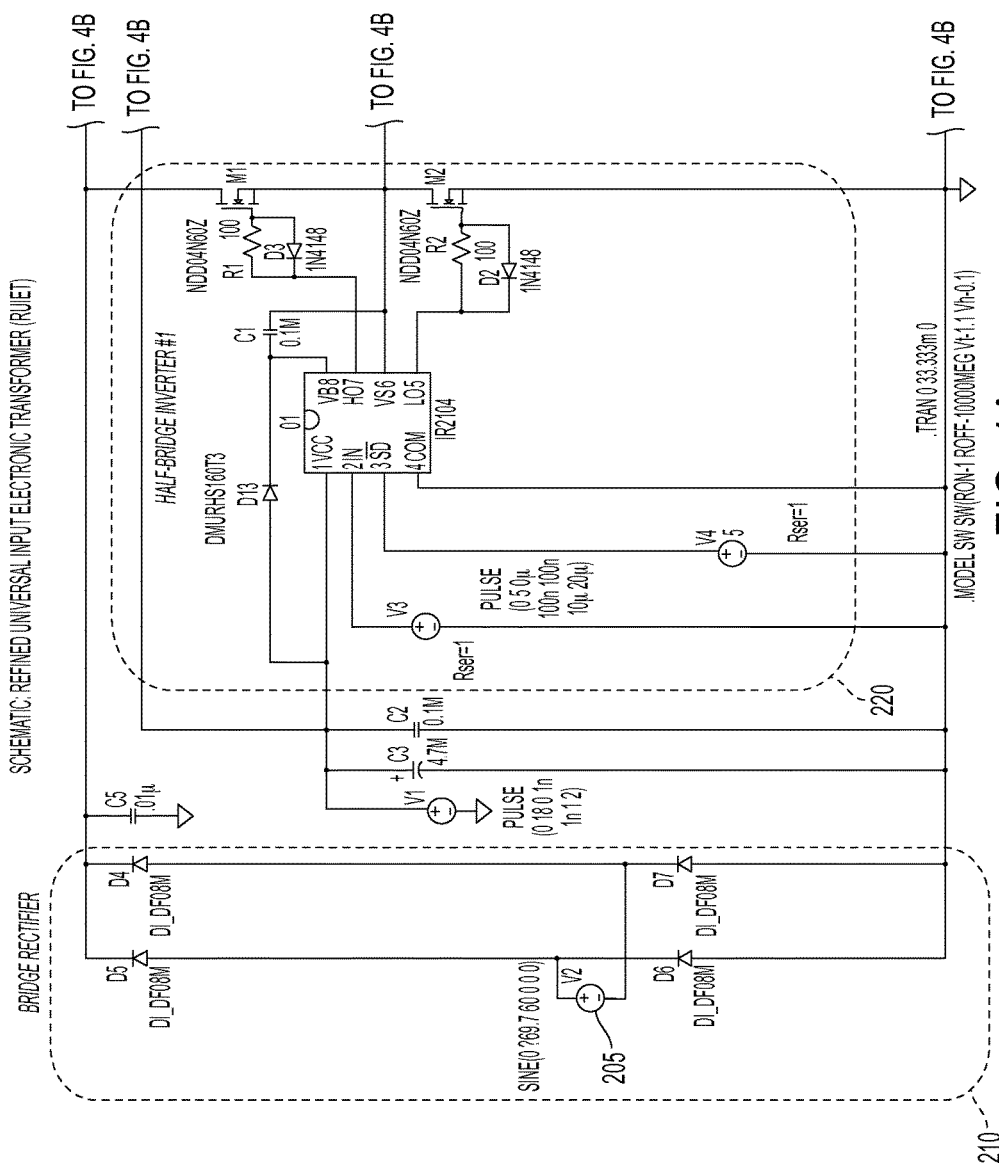
FIGS. 4A and 4B (also referred to collectively herein as FIG. 4) are a circuit diagram illustrating the universal input electronic transformer of FIG. 3.
Figure 4B:
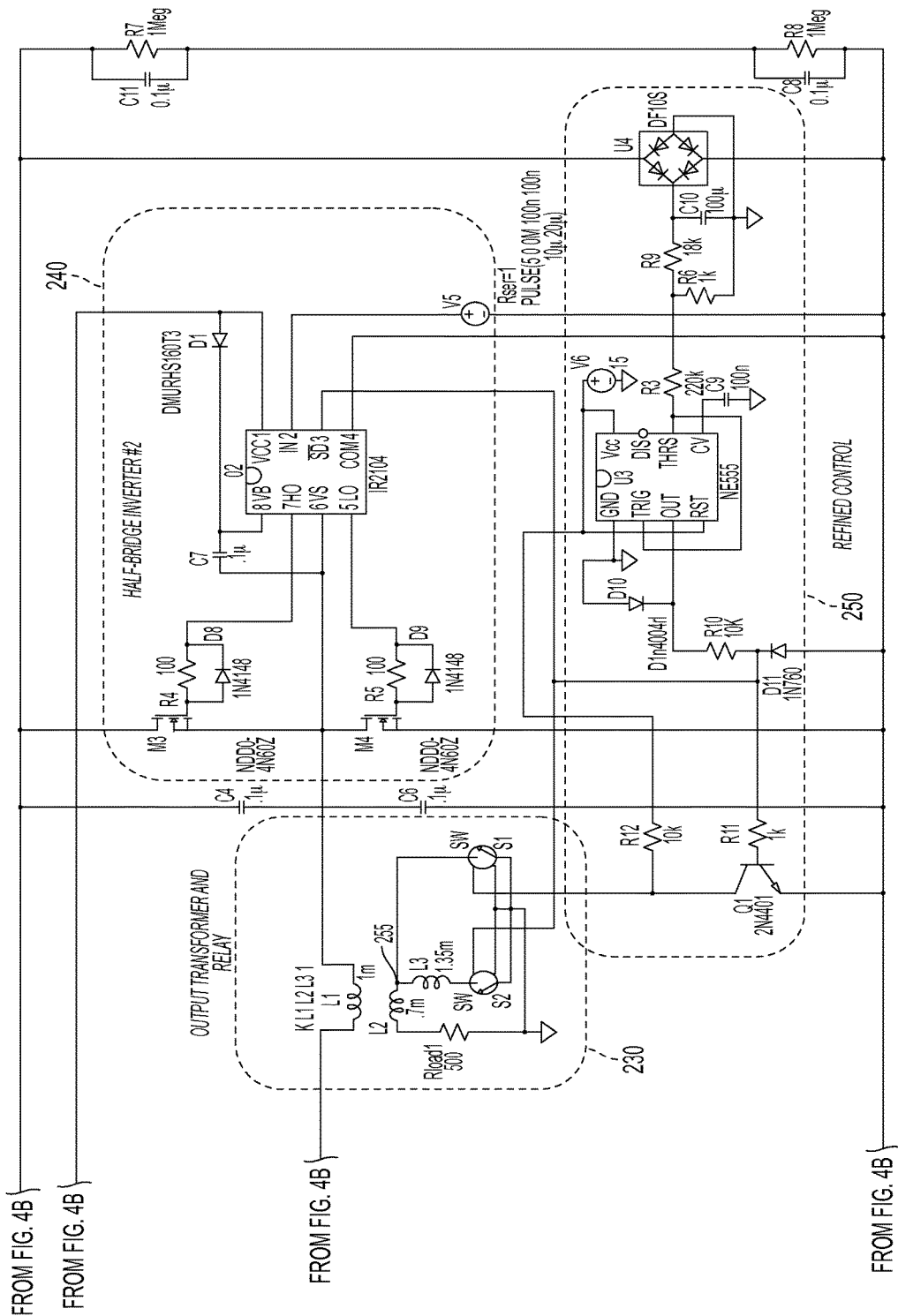

FIGS. 4A and 4B is a circuit diagram illustrating the components of the RUIET 200. In some embodiments, the rectifier 210 is substantially similar to the rectifier 110. The rectifier 210 receives the input voltage from the input 205 and outputs a rectified voltage to the first inverter 220, the second inverter 240, and the controller 250.

The first inverter 220 and the second inverter 240 switch the rectified voltage (i.e., invert the rectified DC-voltage to an inverted AC-voltage). In some embodiments, the first inverter 220 and the second inverter 240 are substantially similar to the first inverter 120 and the second inverter 140. In the illustrated embodiment, the first inverter 220 includes switches M1, M2 and a first driver U1, while the second inverter 240 includes switches M3, M4 and a second driver U2. The first and second drivers U1, U2 receive control signals and selectively turn the switches M1-M4 on and off based on received control signals.

The output transformer & relay 230 receives the switched voltage from the first inverter 220 and the second inverter 240. The output transformer & relay 230 includes a primary coil L1, a secondary coil (L2 or both L2 and L3), a first relay switch S1, and a second relay switch S2. The primary coil L1 receives the switched voltage. Upon receiving the switched voltage, the primary coil L1 electromagnetically induces a switched high frequency (e.g., 50 KHz) output voltage to the secondary coil (L2 or both L2 and L3). The first relay switch S1 and second relay switch S2 are configured to switch the turns ratios of the secondary coil, such that the secondary coil is equivalent to either L2 or both L2 and L3. Switching the turns ratio of the secondary coil produces a substantially similar output voltage regardless of the input voltage. In some embodiments, the output voltage of the RUIET 200 is more constant that the than the previously disclosed SUIET 100 of FIG. 1.

The first relay switch S1 and the second relay switch S2 are controlled by the controller 250. In the illustrated embodiment, the controller 250 is a timing circuit, although other controls may be used. The controller 250 controls the first relay switch S1 and the second relay switch S2 according to the received rectified voltage, and thus the input voltage. If the input voltage is 120VAC RMS, the controller 250 turns relay switch S2 on and relay switch S1 off, therefore the secondary coil equals L2 and L3 together. If the input voltage is 277VAC RMS, the controller 250 turns relay switch S2 off and relay switch S1 on, therefore the secondary coil equals L2 only.

The output voltage is then output from the output 255. The output voltage is substantially the same regardless of the input voltage (e.g., 120VAC RMS or 277VAC RMS). For example, the output voltage is 120VAC RMS regardless of the input being 120VAC RMS or 277VAC RMS. In another embodiment, the output can be 12VAC RMS or 24VAC RMS, depending on the turns ratios and regardless of the input voltage being approximately 120VAC RMS or approximately 277VAC RMS.

Figure 5:
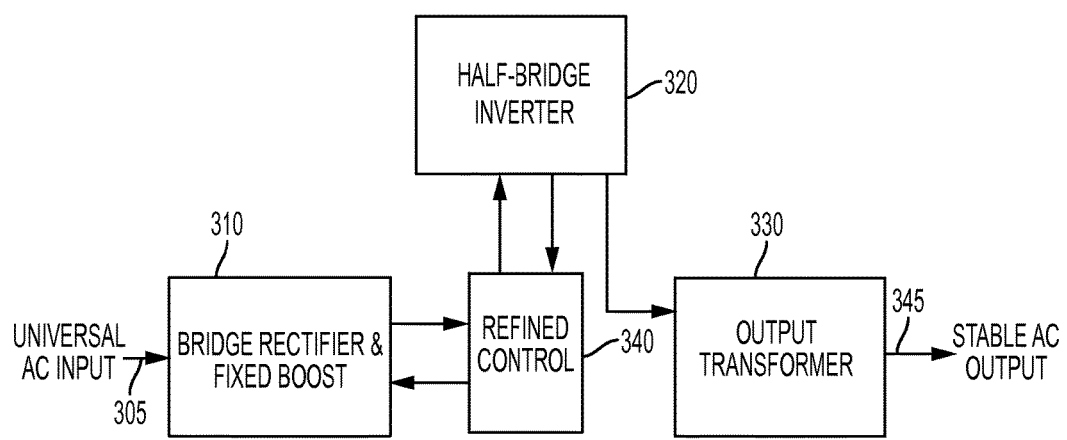
FIG. 5 is a block diagram illustrating a universal input electronic transformer according to another embodiment of the present application.

FIG. 5 is a block diagram illustrating an alternate refined universal input electronic transformer (aRUIET) 300 according to another embodiment of the present application. The aRUIET 300 includes an input 305, a rectifier & fixed boost 310, a first inverter 320, an output transformer 330, a refined control, or controller 340, and an output 345. The input 305 receives the input voltage (e.g., 120VAC RMS or 277VAC RMS).

Figure 6A:
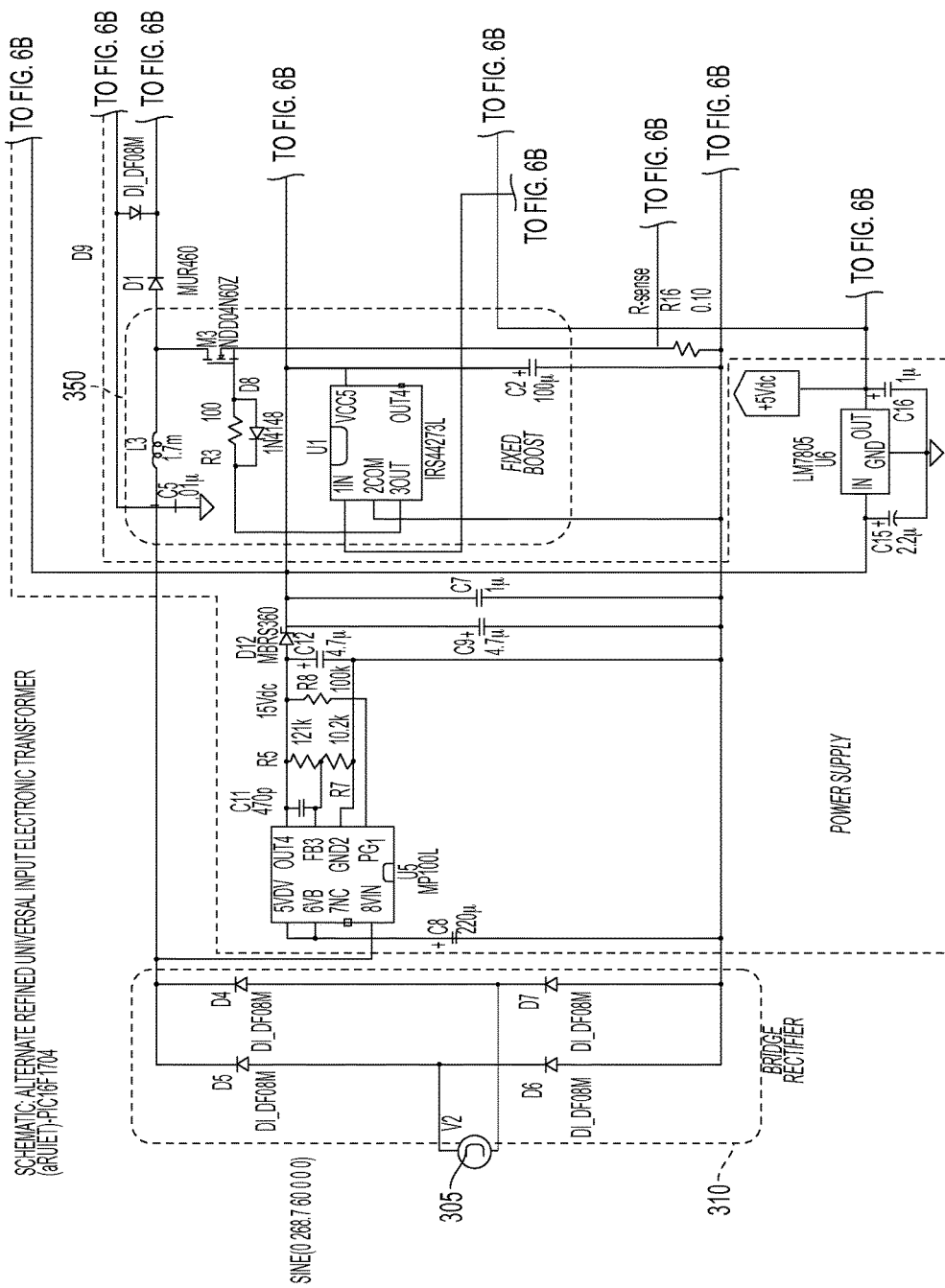
FIGS. 6A and 6B (also referred to collectively herein as FIG. 6) are a circuit diagram illustrating the universal input electronic transformer of FIG. 5.
Figure 6B:
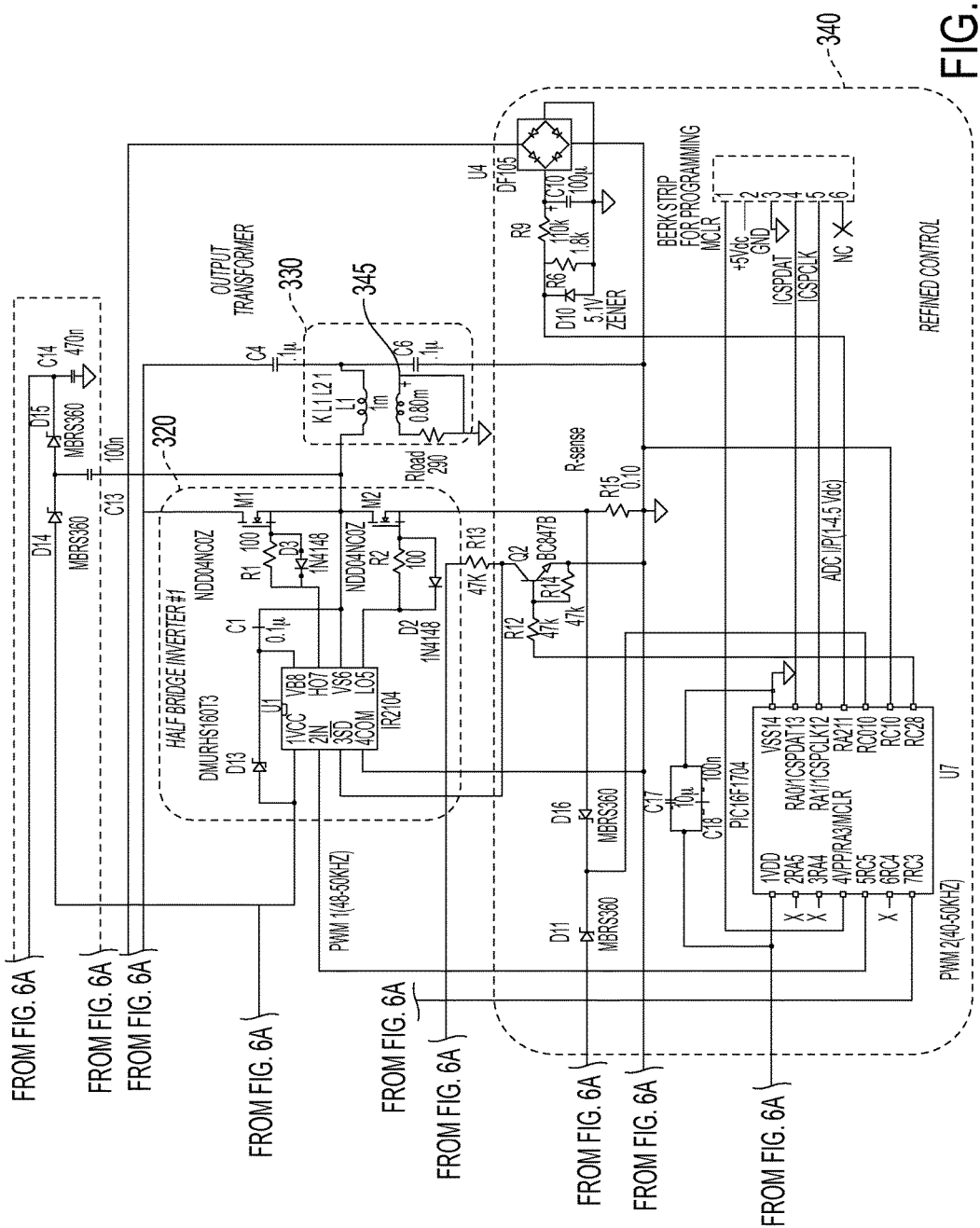

FIGS. 6A and 6B is a circuit diagram illustrating the components of the aRUIET 300. The rectifier 310 receives the input voltage from the input 305, rectifies the input voltage, and outputs a rectified voltage (e.g., a positively-pulsating, direct-current (DC) half sine wave voltage). In some embodiments, the rectifier 310 is substantially the same as rectifier 110 of FIG. 2.

In the illustrated embodiment, the rectifier & fixed boost 310 includes a bridge rectifier (e.g., diodes D1-D4) and a fixed boost, or booster circuit, 350. In such an embodiment, the fixed boost 350 receives the rectified voltage. Depending on the amplitude of the rectified voltage, the fixed boost 350 may further boost (e.g., increase the amplitude) of the rectified voltage.

In other embodiments, the rectifier & fixed boost 310 includes the bridge rectifier (e.g., diodes D1-D4), the fixed boost 350, and a power supply 360. In such an embodiment, the power supply 360 may be substantially similar to the power supply 160 of FIG. 2. In such an embodiment, the fixed boost 350 and the power supply 360 receives the rectified voltage. The fixed boost 350 outputs the rectified voltage or a boosted voltage (depending on the amplitude of the rectified voltage) while the power supply 360 outputs the nominal DC voltage (e.g., 5V DC, 10V DC, 15V DC, etc.). In other embodiments, the bridge rectifier includes only two diodes. In some embodiments, the rectifier & fixed boost 310 further includes a smoothing capacitor configured to smooth out the rectified voltage.

The controller 340 receives the rectified voltage. In some embodiments, controller 340 is substantially similar to controller 150 of FIGS. 1 and 2. Depending on the amplitude of the rectified voltage, the controller 340 controls the fixed boost 350 to either output the boosted voltage or the non-boosted rectified voltage. For example, but not limited to, if the rectified voltage has an amplitude of approximately 170V peak (e.g., the peak of a 120VAC RMS sine wave), the controller 340 will control the fixed boost 350 to boost the rectified voltage to approximately 392V peak (e.g., the peak of a 277VAC RMS sine wave). If the rectified voltage has an amplitude of approximately 277V, the controller 340 will control the fixed boost 350 not to boost the rectified voltage.

The controller 340 further controls the first inverter 320 in a similar fashion as the embodiment illustrated in FIGS. 1 and 2. In the present embodiment, only one half-bridge inverter is necessary. This is because the fixed boost 350 provides a substantially similar rectified voltage to the first inverter 320, regardless of the amplitude of the input voltage.

The first inverter 320 switches the rectified voltage (e.g., boosted rectified voltage or non-boosted rectified voltage) and outputs a switched voltage to the output transformer 330. In some embodiments, the first inverter 320 is substantially similar to the first inverter 120 of the embodiment illustrated in FIGS. 1 and 2.

The output transformer 330 receives the switched voltage and outputs an outputted voltage in a similar fashion as the embodiment of FIGS. 1 and 2. In some embodiments, the output transformer 330 is substantially similar to the output transformer 130 of the embodiment illustrated in FIGS. 1 and 2. The output voltage is then output via the output 345. Similar to the embodiments illustrated in FIGS. 1-4, the output voltage of the aRUIET 300 is substantially similar regardless of the amplitude of the input voltage.

Figure 7:
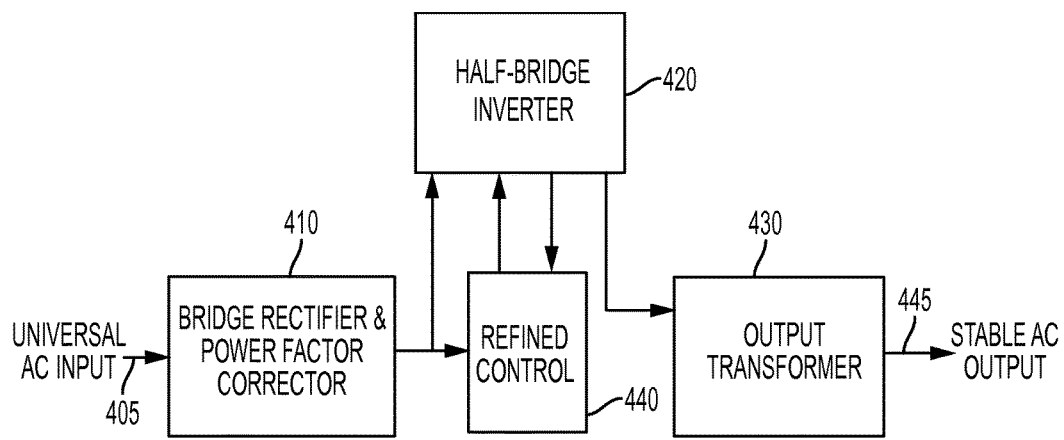
FIG. 7 is a block diagram illustrating a universal input electronic transformer according to another embodiment of the present application.

FIG. 7 is a block diagram illustrating a precise universal input electronic transformer (PUIET) 400 according to another embodiment of the present application. The PUIET 400 includes an input 405, a rectifier & power factor corrector 410, a first inverter 420, an output transformer 430, a refined control, or controller 440, and an output 445. The input 405 receives the input voltage (e.g., 120VAC RMS or 277VAC RMS).

Figure 8:
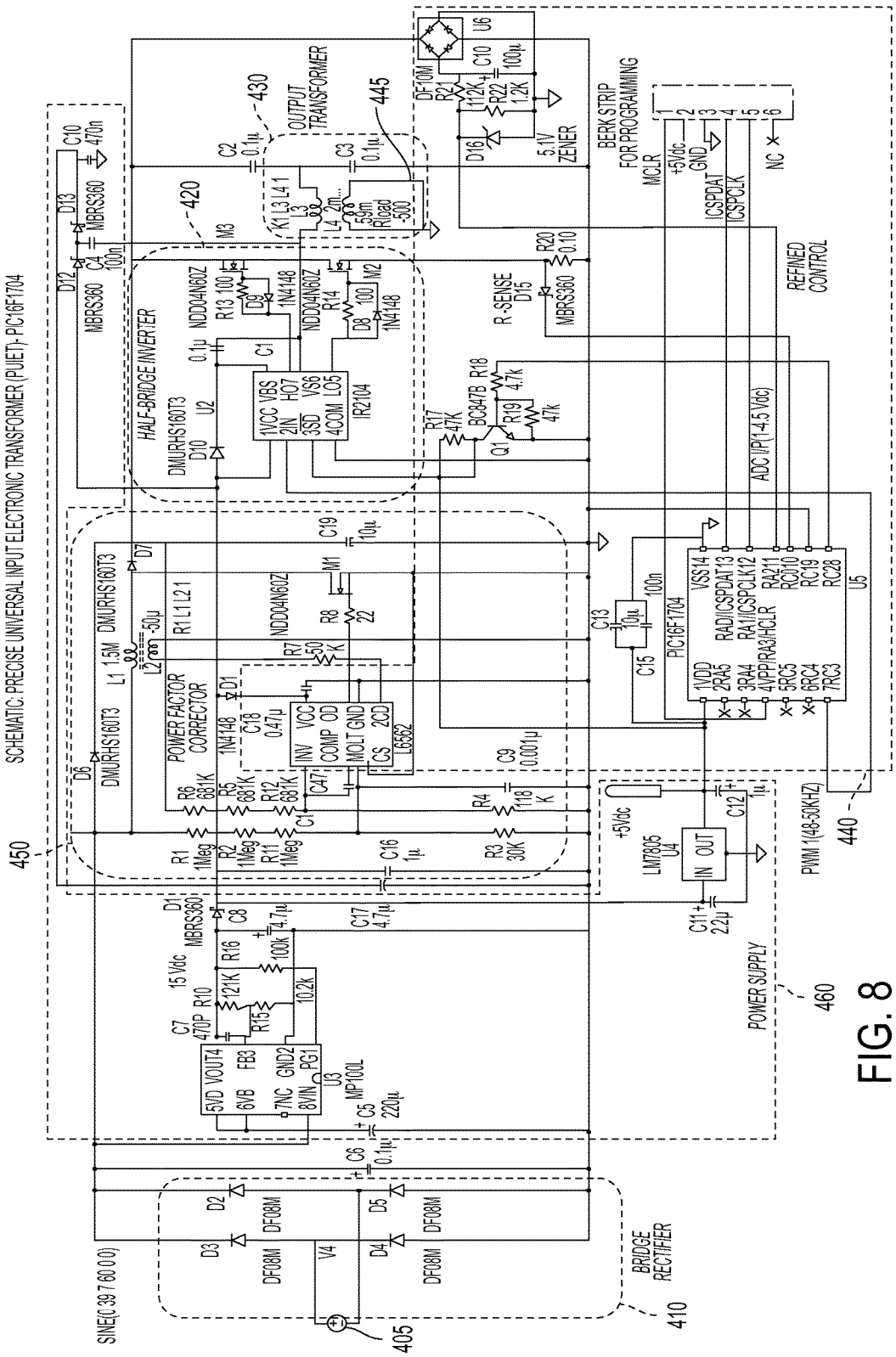
FIG. 8 is a circuit diagram illustrating the universal input electronic transformer of FIG. 7.

FIG. 8 is a circuit diagram illustrating the components of the PUIET 400. In the illustrated embodiment, the rectifier & power factor corrector 410 includes a bridge rectifier (e.g., diodes D1-D4) and a power factor corrector 450. The bridge rectifier rectifies the input voltage received at the input 405. The power factor corrector 410 receives the rectified voltage and outputs a substantially constant DC voltage, regardless of the amplitude of the input voltage. In the illustrated embodiment, the power factor corrector 450 includes a primary coil L1 and a secondary coil L2. In one example of operation, a voltage is expressed across the primary coil L1 when switch M1 is turned on, thus storing energy in the magnetic field of the primary coil L1. Consequently, when switch M1 is turned off, the energy stored in the primary coil L1 is released into a storage capacitor C19, through rectifier D7. The voltage across the primary coil L1 reverses polarity such that it is effectively in series with the input voltage, thus providing a boosted voltage. Once all of the energy from stored in the primary coil L1 is released, the secondary coil L2 provides a signal to the controller 440. The operation is equivalent to a high-frequency switching process that outputs a substantially direct-current output at capacitor C19, that is then output to the half-bridge inverter 420.

In other embodiments, the bridge rectifier includes only two diodes. In other embodiments, the rectifier & power factor corrector 410 includes the bridge rectifier (e.g., diodes D1-D4), the power factor corrector 450, and a power supply 460. In such an embodiment, the power supply 460 may be substantially similar to the power supply 160 of FIG. 2. In such an embodiment, the power supply 460 may supply a nominal DC voltage (e.g., 5V DC, 10V DC, 15V DC, etc.) to the controller 440, for powering the controller 440.

The substantially constant DC voltage, output from the power factor corrector 450, is received by the first inverter 420 and the controller 440. The controller 440 controls the first inverter 420 in a similar fashion as the embodiment illustrated in FIGS. 5 and 6. The first inverter 420 switches the substantially constant DC voltage and outputs a switched voltage to the output transformer 430.

The output transformer 430 receives the switched voltage and outputs an output voltage in a similar fashion as the embodiment of FIGS. 1 and 2. In some embodiments, the output transformer 430 is substantially similar to the output transformer 130 of the embodiment illustrated in FIGS. 1 and 2. The output voltage is then output via the output 445. Similar to the embodiments illustrated in FIGS. 1-6, the output voltage of the PUIET 400 is substantially similar regardless of the amplitude of the input voltage across the entire range of input voltages from 120VAC RMS through 305VAC RMS in, as well as all voltages in-between.

Figure 9:
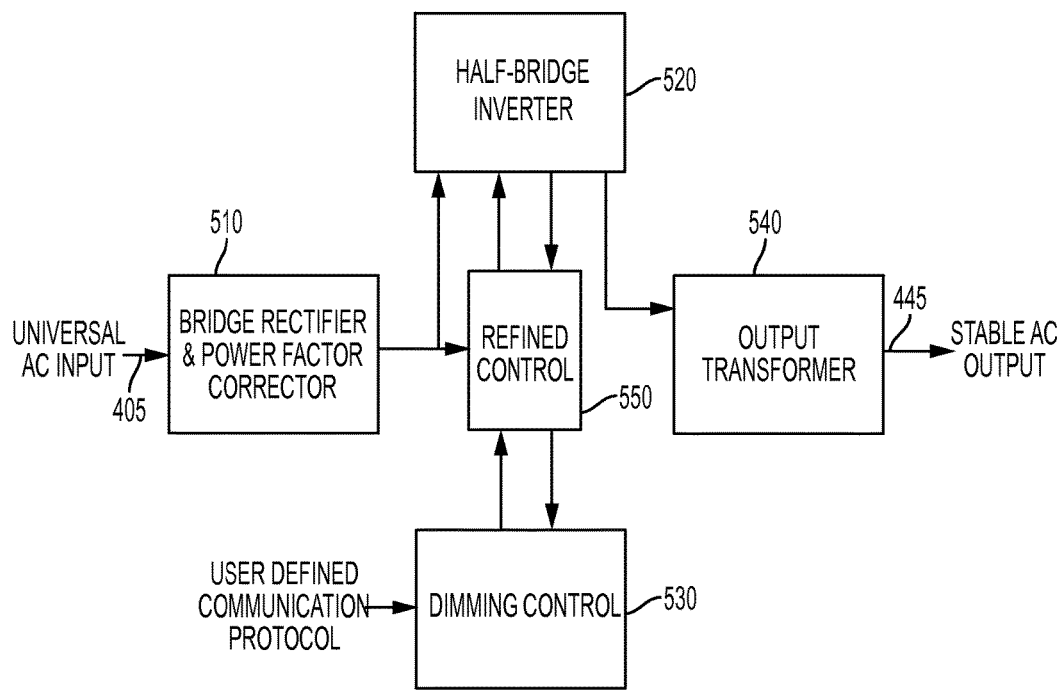
FIG. 9 is a block diagram illustrating a universal input electronic transformer according to another embodiment of the present application.

FIG. 9 is a block diagram illustrating dimmable universal input electronic transformer (DUIET) 500 according to another embodiment of the present application. The DUIET 500 includes an input 505, a rectifier & power factor corrector 510, a first inverter 520, a dimming control, or dimming control circuit, 530, an output transformer 540, a refined control, or controller 550, and an output 555. In some embodiments, the DUIET 500 is substantially similar to the embodiment illustrated in FIGS. 7 and 8, but further includes the dimming control 530.

Figure 10A:
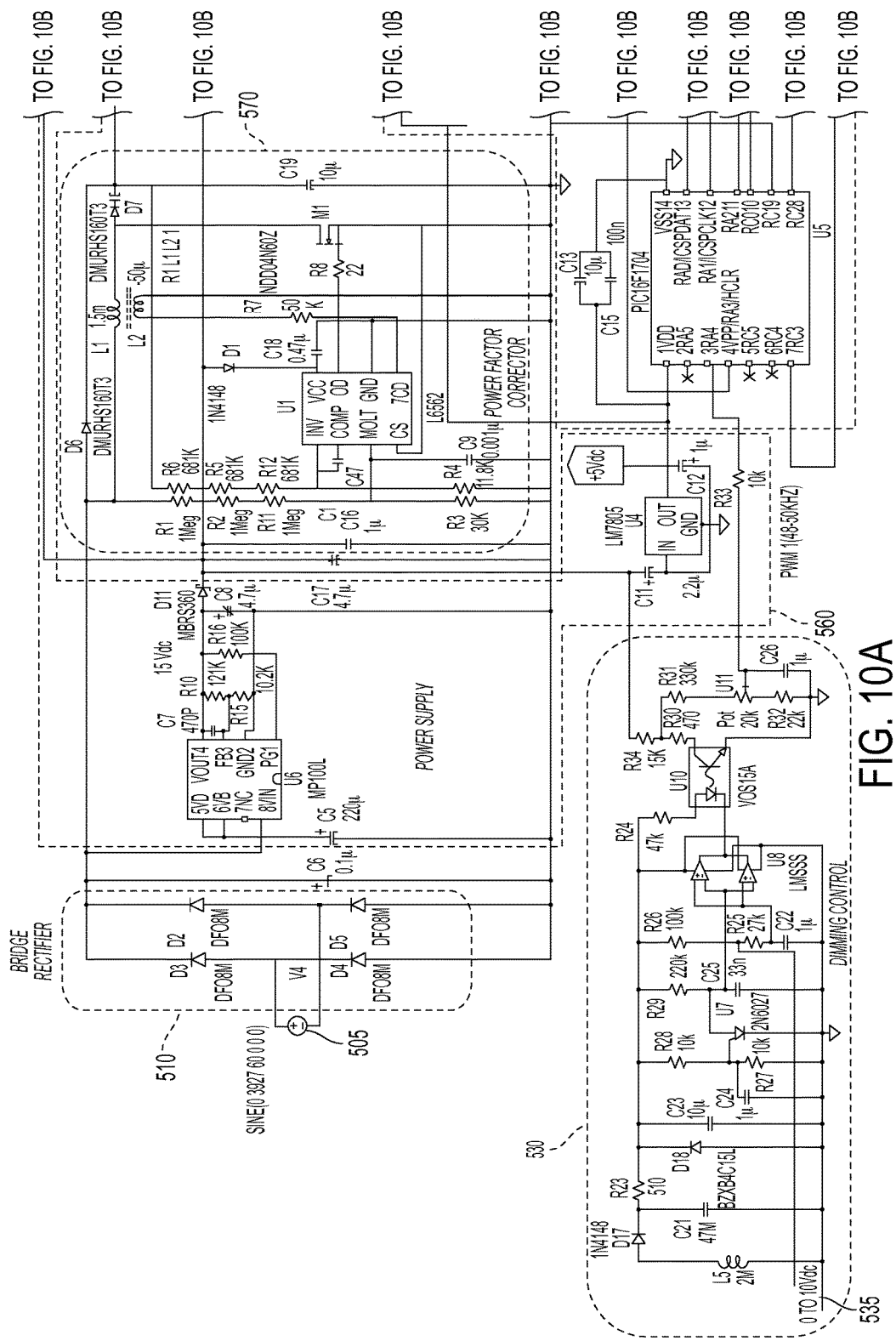
FIGS. 10A and 10B (also referred to collectively herein as FIG. 10) are a circuit diagram illustrating the universal input electronic transformer of FIG. 9.
Figure 10B:
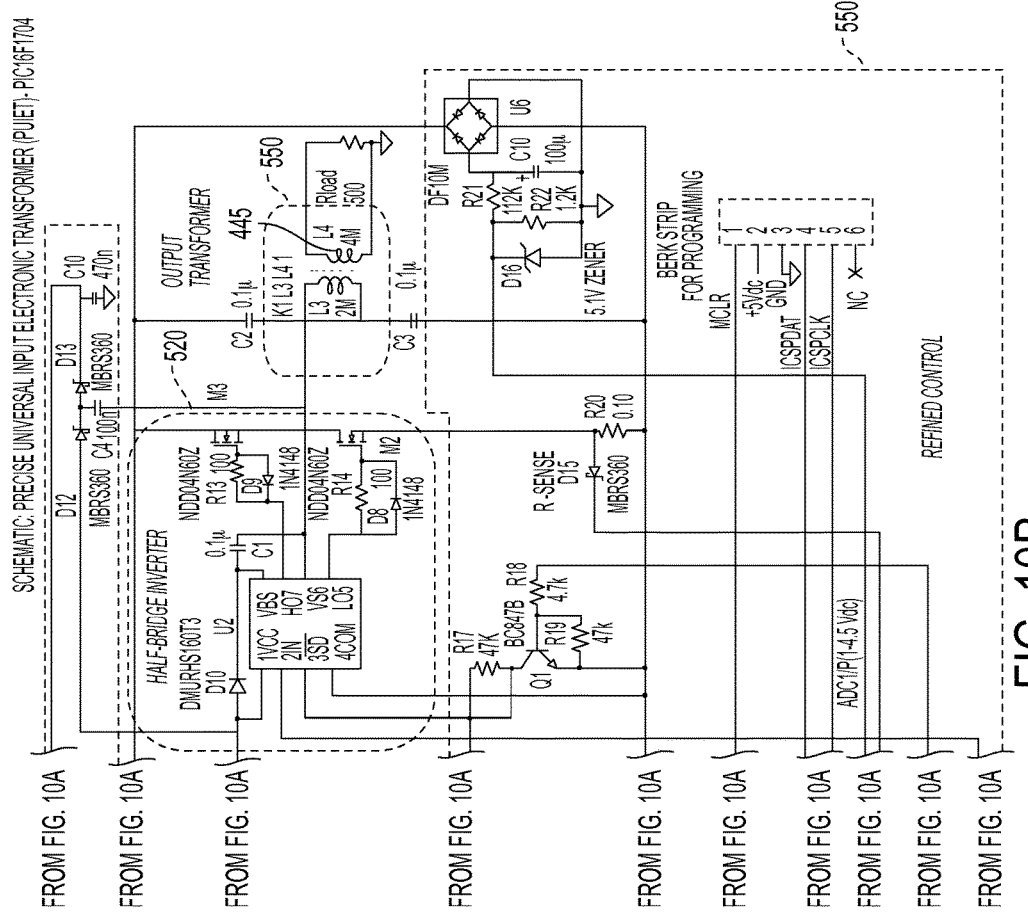

FIGS. 10A and 10B is a circuit diagram illustrating the DUIET 500. In the illustrated embodiment, the dimming control 530 includes a dimming input 535, an opto-isolator, or opto-coupler, U10, and a plurality of electrical and electronic components that provide operational control and protection to the components and modules of the dimming control 530. In the illustrated embodiment, the dimming control 530 is electrically connected to the other components of the DUIET 500, however, in other embodiments, the dimming control 530 may be wireless connected, or connected by any other analog and/or digital protocol known to one skilled in the art.

In operation, a user provides a user-input (e.g., approximately 0VDC to approximately 10VDC), in some embodiments via a current-sinking standard controller, at the dimming input 535 of the dimming control 530. The opto-isolator U10 outputs a DC level signal, based on the user-input, to the controller 550. For example, but not limited to, a user-input of a current-sinking 10VDC will result in a PWM signal having a duty cycle of approximately of 90%, while a user-input of 1VDC will result in a PWM signal having a duty cycle of approximately 10%. In some embodiments, the DUIET 500 can be adjusted to provide a 0% duty cycle for an approximately 0VDC control to provide a dim-to-off feature. The controller 550 receives the PWM signal and outputs a control signal to the first inverter 520 based on the PWM signal. The control signal selectively controls the first inverter 520 to output a switched voltage relating to the user-input received by the dimming control 530.

The output transformer 540 receives the switched voltage and outputs an output voltage in a similar fashion as the embodiment of FIGS. 1 and 2. In some embodiments, the output transformer 540 is substantially similar to the output transformer 130 of the embodiment illustrated in FIGS. 1 and 2. The output voltage is then output via the output 545. The output voltage is substantially the same regardless of the input voltage; rather the output voltage varies based on the received user-input at the dimming control 530.

Figure 11:
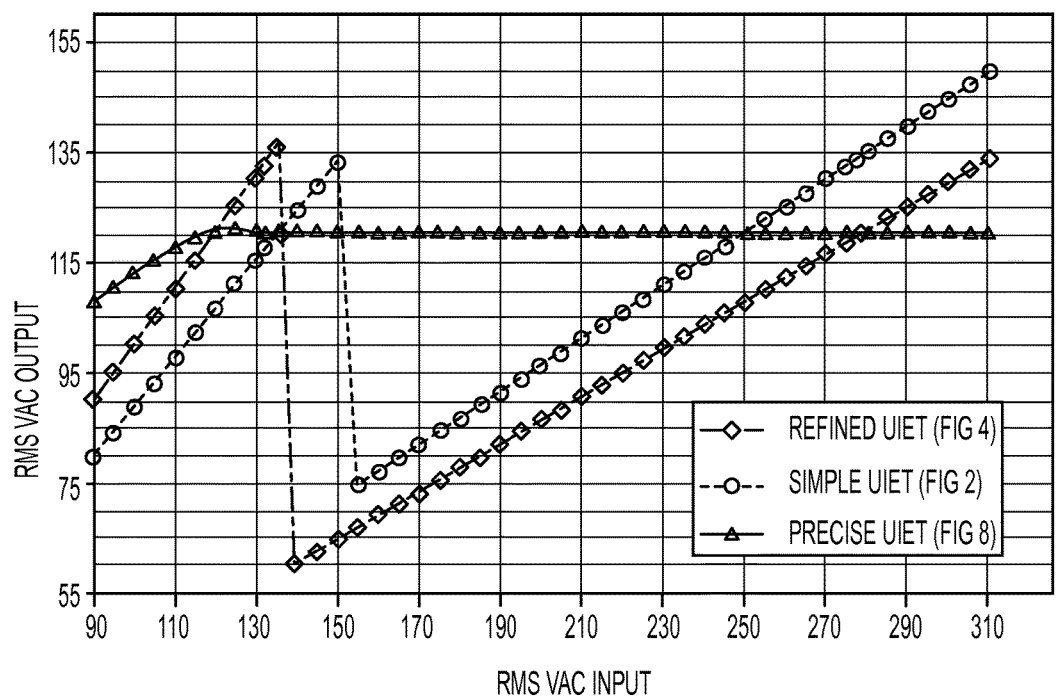
FIG. 11 is a chart illustrating input voltage verse output voltages of the universal input electronic transformers according to FIGS. 1, 3, and 7.

FIG. 11 is a chart illustrating and comparing the input voltage verse the output voltage of the SUIET 100 (FIGS. 1 and 2), the RUIET 200 (FIGS. 3 and 4), and the PUIET 400 (FIGS. 7 and 8). As illustrated, SUIET 100 outputs a voltage of approximately 75VAC RMS to approximately 145VAC RMS regardless when the input voltage is approximately 90VAC RMS to approximately 310VAC RMS. The RUIET 200 outputs a voltage of approximately 60VAC RMS to approximately 135VAC RMS when the input voltage is approximately 90VAC RMS to approximately 310VAC RMS. In some embodiments, the aRUIET 300 outputs substantially similar output voltages to the RUIET 200. The PUIET 400 outputs a voltage of approximately 110VAC RMS to approximately 125VAC RMS when the input voltage is approximately 90VAC RMS to approximately 310VAC RMS. All of the various embodiments discussed above can be adjusted at the output transformer, (e.g., 430 of the PUIET 400, 540 of the DUIET 500) to provide 24VAC or 12VAC outputs. The main advantage of the DUIET 500 and PUIET 400 over the SUIET 100, RUIET 200, and RUIET 300 is that the switched output does not exist within a 120 Hz, (twice the line frequency) envelope as in standard electronic transformers today; therefore, 120 Hz ripple usually transmitted on to the light source is eliminated.

Thus, the present application provides, among other things, a universal input electronic transformer operable to output a substantially constant voltage regardless of the amplitude of the received input voltage. Various features and advantages of the present application are set forth in the following claims.

What is claimed is:
1. An electronic transformer comprising:
an input receiving an input voltage, the input voltage being at least one selected from the group consisting of a first input voltage having a first amplitude and a second input voltage having a second amplitude;
a rectifier receiving the input voltage and outputting a rectified voltage;
an inverter receiving the rectified voltage and outputting an inverted voltage;

a controller receiving the rectified voltage and controlling the inverter to output the inverted voltage;

an output transformer receiving the inverted voltage and outputting an output voltage; and a dimming control circuit configured to receive a user-input and output a control signal based on the user-input, the controller varying the output voltage based on the control signal;

wherein the output voltage is substantially the same regardless of whether the input voltage is the first input voltage or the second input voltage.

2. The electronic transformer of claim 1, further comprising a second inverter receiving the rectified voltage and outputting a second inverted voltage, wherein when the input voltage is the first input voltage, the controller is configured to control the inverter to output the inverted voltage and the second inverter to output the second inverted voltage.

3. The electronic transformer of claim 2, wherein the second inverter is a half-bridge inverter.

4. The electronic transformer of claim 1, wherein the inverter is a half-bridge inverter.

5. The electronic transformer of claim 1, wherein the first amplitude is approximately 120-volts RMS and the second amplitude is approximately 277-volts RMS.

6. The electronic transformer of claim 1, wherein the output voltage is within a range between approximately 100-volts and 140-volts.

7. The electronic transformer of claim 1, wherein the output transformer includes a primary coil and a secondary coil, the secondary coil has at least one selected from the group of a first number of turns and a second number of turns.

8. The electronic transformer of claim 7, wherein the number of turns of the secondary coil is based on the input voltage.

9. The electronic transformer of claim 1, further comprising a booster circuit configured to boost the rectified voltage and output the boosted voltage to the inverter.

10. The electronic transformer of claim 9, wherein the booster circuit boosts the rectified voltage based on the input voltage being the first input voltage.

11. The electronic transformer of claim 1, further comprising a power factor corrector receiving the rectified voltage and outputting a substantially constant direct-current voltage to the inverter regardless of the input voltage being the first input voltage or the second input voltage.

12. An electronic transformer comprising:

an input receiving an input voltage, wherein the input voltage is at least one selected from the group consisting of a first input voltage having a first amplitude and a second input voltage having a second amplitude;

a rectifier receiving the input voltage and outputting a rectified voltage;

a first inverter receiving the rectified voltage and outputting a first inverted voltage;

a second inverter receiving the rectified voltage and outputting a second inverted voltage a controller receiving the rectified voltage, the controller further configured to control the first inverter to output the first inverted voltage when the input voltage is the second input voltage, and control the first and second inverters to output the first and second inverted voltages when the input voltage is the first input voltage;

an output transformer receiving at least one selected from the group consisting of the first inverted voltage and a combination of the first and second inverted voltages, the output transformer further outputting an output voltage; and a dimming control circuit configured to receive a user-input and output a control signal to the controller based on the user-input, the controller varying the output voltage based on the control signal, wherein the output voltage is substantially the same regardless of whether the input voltage is the first input voltage or the second input voltage.

13. The electronic transformer of claim 12, wherein the output voltage is substantially the same regardless of the input voltage being the first input voltage or the second input voltage.

14. The electronic transformer of claim 12, wherein the first amplitude is approximately 120-volts RMS and the second amplitude is approximately 277-volts RMS.

15. A method of transforming a voltage, the method comprising:

receiving an input voltage, the input voltage being at least one selected from the group consisting of a first input voltage having a first amplitude and a second input voltage having a second amplitude;

rectifying the input voltage;

outputting a rectified voltage;

inverting the rectified voltage;

outputting an inverted voltage;

receiving the inverted voltage;

outputting an output voltage;

receiving a user-input;

outputting a control signal based on the user-input; and varying the output voltage based on the control signal;

wherein the output voltage is substantially the same regardless of the input voltage being the first input voltage or the second input voltage.

16. The method of claim 15, further comprising outputting a second inverted voltage when the input voltage is the first input voltage.

17. The method of claim 15, wherein the first amplitude is approximately 120-volts RMS and the second amplitude is approximately 277-volts RMS.

18. The method of claim 15, wherein the output voltage is within a range between approximately 100-volts and 140-volts.

* * * * *